US006616348B1

(12) United States Patent
Barnard

(10) Patent No.: US 6,616,348 B1
(45) Date of Patent: Sep. 9, 2003

(54) METHOD AND OPTICAL COMMUNICATION NETWORK FOR BIDIRECTIONAL PROTECTION PROTOCOLS

(75) Inventor: Chris Barnard, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/493,495

(22) Filed: Jan. 28, 2000

(51) Int. Cl.[7] .................................................. H04J 14/00
(52) U.S. Cl. .................................................. 398/3; 398/7
(58) Field of Search ..................... 359/110, 119, 359/127; 370/221–228; 398/3–5, 7

(56) References Cited

U.S. PATENT DOCUMENTS

| | | | | |
|---|---|---|---|---|
| 5,406,401 A | * | 4/1995 | Kremer | 340/2.1 |
| 5,448,389 A | | 9/1995 | Peacock | 359/119 |
| 5,530,694 A | | 6/1996 | Guezou et al. | 370/16.1 |
| 5,548,431 A | | 8/1996 | Shin et al. | 359/119 |
| 5,572,612 A | | 11/1996 | Delavaux et al. | 385/24 |
| 6,278,536 B1 | * | 8/2001 | Kai et al. | 359/110 |
| 6,298,038 B1 | * | 10/2001 | Martin et al. | 370/216 |
| 6,426,815 B1 | * | 7/2002 | Koehler | 359/119 |
| 6,456,407 B1 | * | 9/2002 | Tammela et al. | 359/110 |

* cited by examiner

Primary Examiner—Leslie Pascal
Assistant Examiner—Shi K. Li
(74) Attorney, Agent, or Firm—Joshua D. Isenberg; David A. Fox; Michael R. Cammarata

(57) ABSTRACT

A method for operating a redundant optical communication network has at least two network transmission paths, assigns first and second protection protocols to switched signals and secondary signals respectively, adds and drops the switched signals and secondary signals on the at least two network transmission paths, makes the switched signals and the secondary signals to counter-propagate along the at least two network transmission paths, therefore, the redundant optical communication network can support different data types and different protection mechanisms. An optical communication network configured by the method of the present invention includes at least two network transmission paths, a first and a second processing means for processing switched signals and secondary signals in accordance a first protection protocol and a second protection protocol respectively, a primary and a secondary add/drop mechanisms for selectively adding and dropping the switched signals and secondary signals to counter-propagate along said at least transmission paths. The network can support different data types and different protection mechanisms.

21 Claims, 4 Drawing Sheets

METHOD AND OPTICAL COMMUNICATION NETWORK FOR BIDIRECTIONAL PROTECTION PROTOCOLS

BACKGROUND OF THE INVENTION

This invention relates generally to optical transmission methods and systems and particularly to a new method and new optical communication network for bidirectional protection protocols.

A ring is the favored network topology for telecommunication and data communication application requiring a high degree of reliability. A ring network provides two separate redundant physical paths between a pair of terminals. These redundant paths combining with protection switch mechanisms maintain the data connection when a cable is cut or equipment failures occur.

A SONET ring network can be configured as a path-switch ring or line-switched ring. A path-switched ring has a separate protection switch mechanism for each path. A line-switched ring has a separate protection switch mechanism for each line. There are two kinds of standard SONET rings, one is a two-fiber unidirectional path-switched ring (UPSR), another is a two-fiber or four-fiber bidirectional line-switched rings (BLSR). However, the disadvantage of the SONET ring network is that it cannot provide unique protection switching for the different channels and it cannot selectively provide protection switching for some channels, but not all.

Optical ring networks can be deployed with wavelength-division multiplexing to provide a means of transporting multiple circuits on the same fiber. The separate circuits can also carry signals with different protocols, e.g., SONET, fiber channel, or Ethernet. However, the optical ring networks have the same disadvantage of the SONET ring networks mentioned above.

The WDM ring network can deploy architecture similar to the SONET UPSR and BLSR to provide an optical ring protection switchings, which are alike to the protection switchings provided by the UPSR and BLSR of SONET against fiber cuts. However, it has the same disadvantage of the SONET ring networks mentioned above.

In prior art, one solution for overcoming some of these disadvantages is to provide extra WDM Capability for the channels that are not supported by the ring's inherent protection switching architecture. At a node, separate optical filters are used to attach the unswitched channels after the protection switch, and drop the unswitched channels after the protection switch. Any node that does not access the unswitched traffic must use optical filters to provide a bypass path around that node. This solution has many disadvantages:

If WDM filter is used to separate the unswitched signals from the switched signals for providing a bypass around a node, the insertion loss of the pass through traffic increases as more unswitched channels are added. Further more, there are wavelength restrictions on the unswitched signals.

If there are optical amplifiers in the network, then the power levels of the unswitched channels must be carefully managed to ensure that the channel powers remain within the amplifier dynamic range. This may require adding optical attenuators to the network to adjust the power levels of these unswitched channels.

The unswitched channels can be effective when the number of unswitched channels is low only. As the number of unswitched channels increases, the problem of separately managing the power levels of the switched and unswitched channels becomes intractable. Also, while the number of unswitched channels increases, the insertion losses from the unswitched add, drop, and bypass filters increase. This increased loss can reduce the system margin to the point where more optical amplifiers are required (thereby increasing the network cost). Ultimately, as more unswitched channels are added, the increased loss and increased constraints on the power management make the network configuration unsupportable.

U.S. Pat. No. 5,572,612, Delavaux, et al., Bidirectional Optical Transmission System, disclosed a system for bidirectional transmission over a single optical fiber. It is obtained in an optical communication system by using a three port circulator in customer premises equipment together with an optical fiber amplifier and a narrow band filter. Also, the invention appears to be solving bidirection protection mentioned for the first time here, but this invention cannot solve the problem of bidirectional protection protocols in a network.

U.S. Pat. No. 5,548,431, Shin, et al., Bidirectional Multi-Channel Optical Ring Network Using WDM Techniques, disclosed a bidirectional multi-channel all-optical ring network to allowing optical data signals to be transmitted through the channel of shorter distance. This invention still cannot solve the problem of bidirectional protection protocols in a network.

U.S. Pat. No. 5,530,694, Guezou, et al., Device for Connecting a Station to a Local Area Network at Least One Ring, disclosed a device for connecting a station to a local network with at least one ring, that includes switching arrangements associated with its circuits for regenerating a signal in order to bypass a station. U.S. Pat. No. 5,448,389, Peacock, Passive Optical Network, disclosed an optical ring mesh network, that includes a plurality of optical rings, each of which is coupled to another ring by a respective optical coupler. These two inventions do not solve the problem of bidirectional protection protocols in a network too.

OBJECTS AND ADVANTAGES OF THE INVENTION

It is a primary object of this invention to provide a method of operating a bidirection optical communication network. The method supports different data types and different protection mechanisms in the redundant optical communication network.

It is another object of this invention to provide a method of operating a redundant optical communication network, the method provides protection switches for the channels that do not have their own protection switch mechanism, while at the same time not switching channels that have their own protection switching mechanisms and redundant paths.

It is another object of this invention to provide a method of operation for a redundant optical communication network having at least two network transmission paths for carrying switched signals and secondary signals, the method can be used to separately add and drop the switched signals and secondary signals efficiently.

The advantages of the present inventions are obvious as compared with the prior art. The main advantage of the present inventions is that the switched and unswitched traffic are engineered separately. Except for the insertion loss of the circulators, the presence of the unswitched bands should not affect the switched power levels, and vice versa.

The further advantage of the present inventions is that compared to using extra WDM channels for the unswitched traffic, with circulators there are no wavelength restrictions on the unswitched bands. If the isolation of the circulators is adequate, people can re-use the same wavelengths for the two directions.

The further advantage of the present inventions is that the circulators provide much better isolation than typical band filters, so the crosstalk penalty decreases with circulators.

The further advantage of the present inventions is that with circulators, the loss in the pass through path for the switched channels is fixed to the loss of the circulator pair, independently of how many unswitched channels are used. In the prior art, the WDM filter is used to separate the unswitched traffic from the switched traffic, so the insertion loss of the pass through traffic increases as more unswitched channels are added.

SUMMARY OF THE INVENTION

To achieve the above objects, the present invention provides a method of operating a redundant optical communication network having at least two network transmission paths for carrying switched signals and secondary signals, said method comprising the following steps:

a) assigning a first protection protocol to said switched signals;

b) assigning a second protection protocol to said secondary signals;

c) selectively adding and dropping said switched signals on said at least two transmission paths; and d) Selectively adding and dropping said secondary signals on said at least two transmission paths;

whereby said adding and dropping steps are performed such that said switched signals and said secondary signals are counter-propagating along said at least two net work transmission paths.

In addition, the present invention provides an optical communication network having at least two network transmission paths for carrying switched signals and secondary signals, said optical communication network comprising:

e) a first processing means for processing said switched signals in accordance with a first protection protocol;

f) a second processing means for processing said secondary signals in accordance with a second protection protocol;

g) a primary add/drop mechanism for selectively adding and dropping said switched signals on said at least two transmission paths;

h) a secondary add/drop mechanism for selectively adding and dropping said secondary signals on said at least two transmission paths;

whereby said primary add/drop mechanism and said second add/drop mechanism are configured to add and drop said switched and said secondary signals to counter-propagate along said at least two network transmission paths.

DETAILED DESCRIPTION

With reference to the drawings, the present invention is given to the following detailed description. It will be apparent that those skilled people in the art may modify the present invention in many ways based on the disclosure. Accordingly, the scope of the invention should be determined by the following clams and their legal equivalents.

Figure 1:
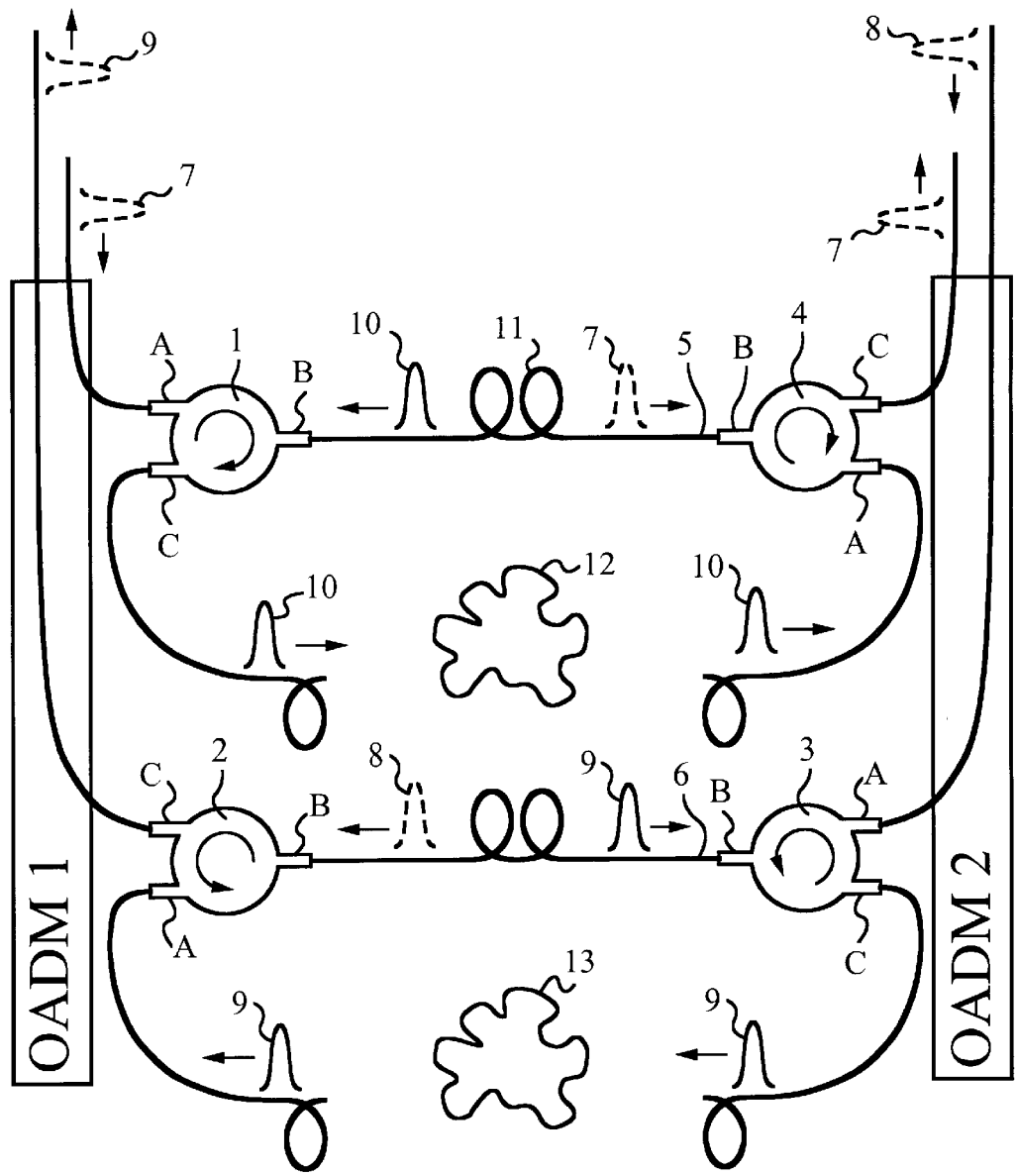
FIG. 1 is a schematic diagram of a preferred method providing bidirectional protection protocols for a redundant optical communication network.

With reference to the FIG. 1, two optical add/drop mechanisms (OADM 1 and OADM 2) are connected by two optical fibers 5, 6 and optical circulators 1, 2, 3, 4. Each of the circulators 1, 2, 3, 4 is preferable to non-reciprocal optical device with 3-port circulators in this application. The three ports of 3-port circulator are labeled A, B, C respectively. Light input at port A is transmitted to port B to output, light input at port B is transmitted to port C to output, and light input to port C is transmitted to port A to output.

The configuration of the communication network between OADM 1 and OADM 2 is through that port B of the circulator 1 and port B of the circulator 4 which are connected by the optical fiber 5, and port B of the circulator 2 and port B of the circulator 3 which are connected by the optical fiber 6.

The traffic of an optically switched signal 7 from OADM 1 to OADM 2 is as follows: The switched signal 7 is added to port A of the circulator 1 by the OADM 1, then the switched signal 7 is transmitted to port B only but not port C of the circulator 1 as the circulator 1 is a non-reciprocal optical device. After that, the switched signal 7 is output by port B of the circulator 1, passed through the link optical fiber 5 and received by the port B of the circulator 4. Subsequently, the received signal 7 is transmitted to port C only but not port A of the circulator 4 as the circulator 4 is a non-reciprocal optical device. Later on, the signal is output by port C of the circulator 4 to OADM 2.

The traffic of an optically switched signal 8 from OADM 2 to OADM 1 is as follows: The switched signal 8 is added to port A of the circulator 3 by the OADM2, then the switched signal 8 is transmitted to port B only but not port C of the circulator 3 as the circulator 3 is a non-reciprocal optical device. After that, the switched signal 8 is output by port B of the circulator 3, passed through the link optical fiber 6 and received by the port B of the circulator 2. Subsequently, the received signal 8 is transmitted to port C only but not port A of the circulator 2 as the circulator 2 is a non-reciprocal optical device. Later on, the signal is output by port C of the circulator 2 to OADM 1.

The traffic of a secondary signal 9 from OADM 1 to OADM 2 is as follows: The secondary signal 9 is added to port A of the circulator 2, then the secondary signal 9 is transmitted to port B only but not port C of the circulator 2 as the circulator 2 is a non-reciprocal optical device. After that, the secondary signal 9 is output by port B of the circulator 2, passed through the link optical fiber 6 and received by the port B of the circulator 3. Subsequently, the received secondary signal 9 is transmitted to port C only but not port A of the circulator 3 as the circulator 3 is a non-reciprocal optical device. Later on, the secondary signal 9 is output by port C of the circulator 3.

The traffic of a secondary signal 10 from OADM 2 to OADM 1 is as follows: The secondary signal 10 is added to port A of the circulator 4, then the secondary signal 10 is transmitted to port B only but not port C of the circulator 4 as the circulator 4 is a non-reciprocal optical device. After that, the secondary signal 10 is output by port B of the circulator 4, passed through the link optical fiber 5 and received by the port B of the circulator 1. Subsequently, the received secondary signal 10 is transmitted to port C only but not port A of the circulator 1 as the circulator 1 is a non-reciprocal optical device. Later on, the secondary signal 10 is output by port C of the circulator 3.

The above description shows that the traffic of the optically switched signal 7 from OADM 1 to OADM 2 is transmitted from left to right in a counterclockwise fashion through fiber, the traffic of optically switched signal 8 from OADM 2 to OADM 1 is transmitted from right to left in a clockwise fashion through fiber. The traffic of secondary signals is added and dropped through the optical circulators. The traffic of secondary signal 9 from OADM 1 to OADM 2 is transmitted from left to right in a clockwise fashion through fiber, the traffic of secondary signal 10 from OADM 2 to OADM 1 is transmitted from right to left in a counterclockwise fashion through fiber. Therefore, the switched signals 7, 8 and the secondary signals 9, 10 are counter-propagating along the two network transmission paths 5, 6.

A first protection protocol is assigned to said switched signals 7, 8 and a second protection protocol is assigned to said secondary signals 9, 10.

As an alternative embodiment, bidirectional fiber amplifiers 11 can be connected in the optical fibers 5 and 6 respectively for long distance communication.

In the present invention, the switched signals with the assigned first protection protocol and the secondary signals with the assigned second protection protocol are counter-propagating along the network transmission paths.

Figure 2:
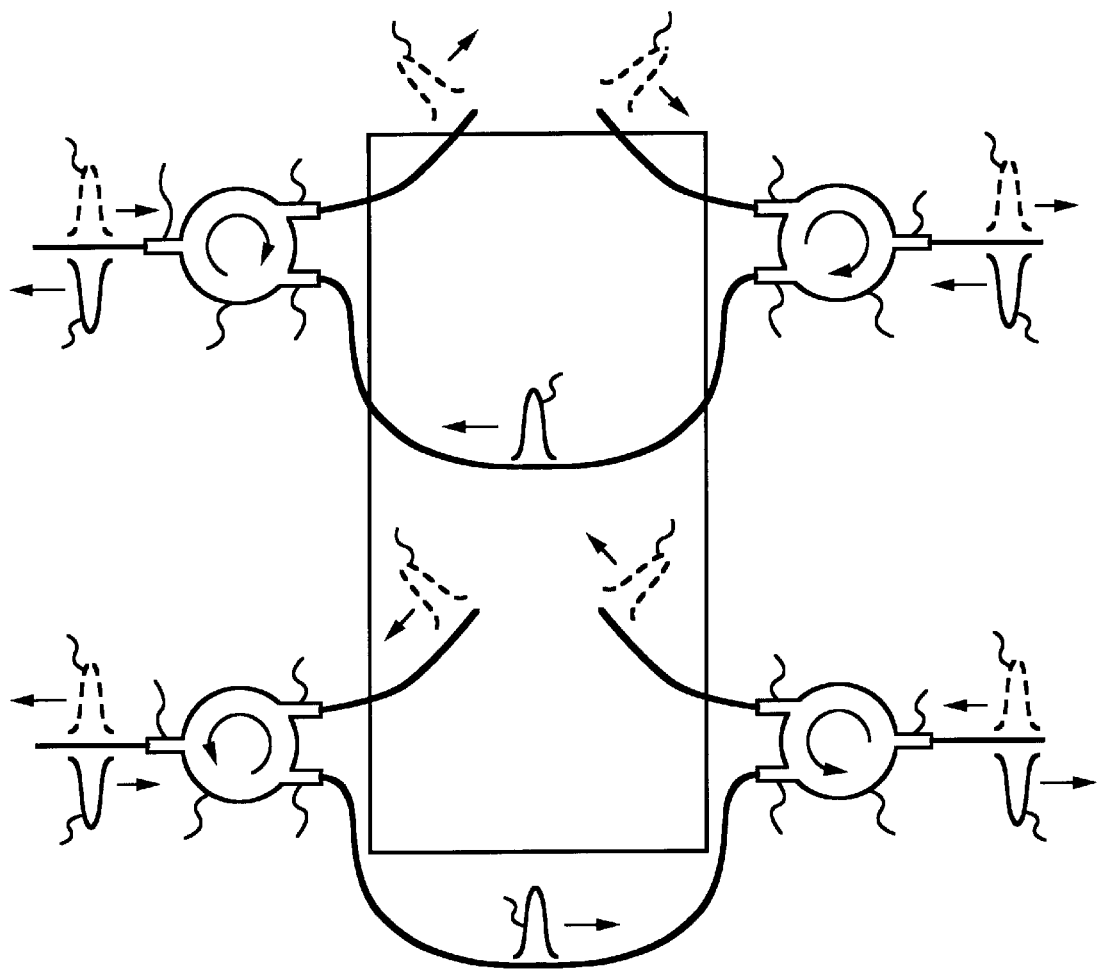
FIG. 2 is a schematic diagram of transmission traffic of unswitched bands in the method shown in the FIG. 1.

With reference to the FIG. 2, it shows the traffic way for the secondary signals and the switched signals.

The traffic way of secondary signal 19 is as follows: the secondary signal 19 is added to port B of the circulator 15, then the secondary signal 19 is transmitted to port C of the circulator 15. After that, the secondary signal 19 is output by port C of the circulator 15, passed through the link optical fiber 22, received by port A of the circulator 14. Later on, the secondary signal 19 is transmitted to port B of the circulator 14 and dropped from therein.

The traffic way of secondary signal 21 is as follows: the secondary signal 21 is added to port B of the circulator 16, then the secondary signal 19 is transmitted to port C of the circulator 16. After that, the secondary signal 21 is output by port C of the circulator 16, passed through the link optical fiber 23, received by port A of the circulator 17. Later on, the secondary signal 21 is transmitted to port B of the circulator 17 and dropped from therein.

The secondary signals 19, 21 are separated by the circulators 15, 16 from the switched signals 18, 20 and routed around the OADM. The OADM can be a node in the network.

The traffic way of switched signal 18 is as follows: the switched signal 18 is added by the OADM to port A of the circulator 15, then being transmitted to port B of the circulator 15. After that, the switched signal 18 is output by port B of the circulator 18, passed through a link optical fiber, received by port B of circulator 14. Later on, the switched signal 18 is transmitted to port C of the circulator 14 and dropped from there to OADM.

The traffic way of switched signal 20 is as follows: the switched signal 20 is added by the OADM to port A of the circulator 16, then being transmitted to port B of the circulator 16. After that, the switched signal 20 is output by port B of the circulator 16, passed through a link optical fiber, received by port B of circulator 17. Later on, the switched signal 20 is transmitted to port C of the circulator 17 and dropped from there to OADM.

The switched signals 18, 20 are separated by the circulators 14, 17 from the secondary signals 19, 21. The adding and dropping of the switched signals 18, 20 are performed by the OADM. The OADM can be a node in the network.

Alternative embodiments are made for the above said method shown in FIG. 1 and FIG. 2 and are described as follows:

Unswitched WDM channels can be added, dropped and passed through independently from the switched traffic. If optical amplifiers are required, they can be located within the OADM for the optically switched channels and located on the circulator traffic way for the unswitched channels. The optical amplifiers can be standard unidirectional amplifiers with optical isolators, so that they provide further isolation from the traffic propagating in the opposite direction.

The secondary signals are unswitched signals.

The second signals are selected from the group consisting of switched traffic and unswitched traffic.

The second signals can comprise a group of WDM signals or DWDM signals.

The switched signals can consist of a group of WDM signals or DWDM signals.

The communication network is a ring or a ring selected from the group consisting of two-fiber rings and four-fiber rings.

The first protection protocol is assigned from the group consisting of optical UPSR, optical BLSR, or optical shared-wavelength path-switched ring.

The second protection protocol is assigned from the group consisting of SONET UPSR, SONET BLSR, path-switched, line switched external-protection protocols.

The unswitched signals are assigned an unswitched traffic transmission format and switched signals are assigned a switched traffic transmission format.

The unswitched transmission format and the switched transmission format are selected from the group consisting of SONET, Ethernet, fiber channel, ESCON, FICON, FDDI.

Figure 3:
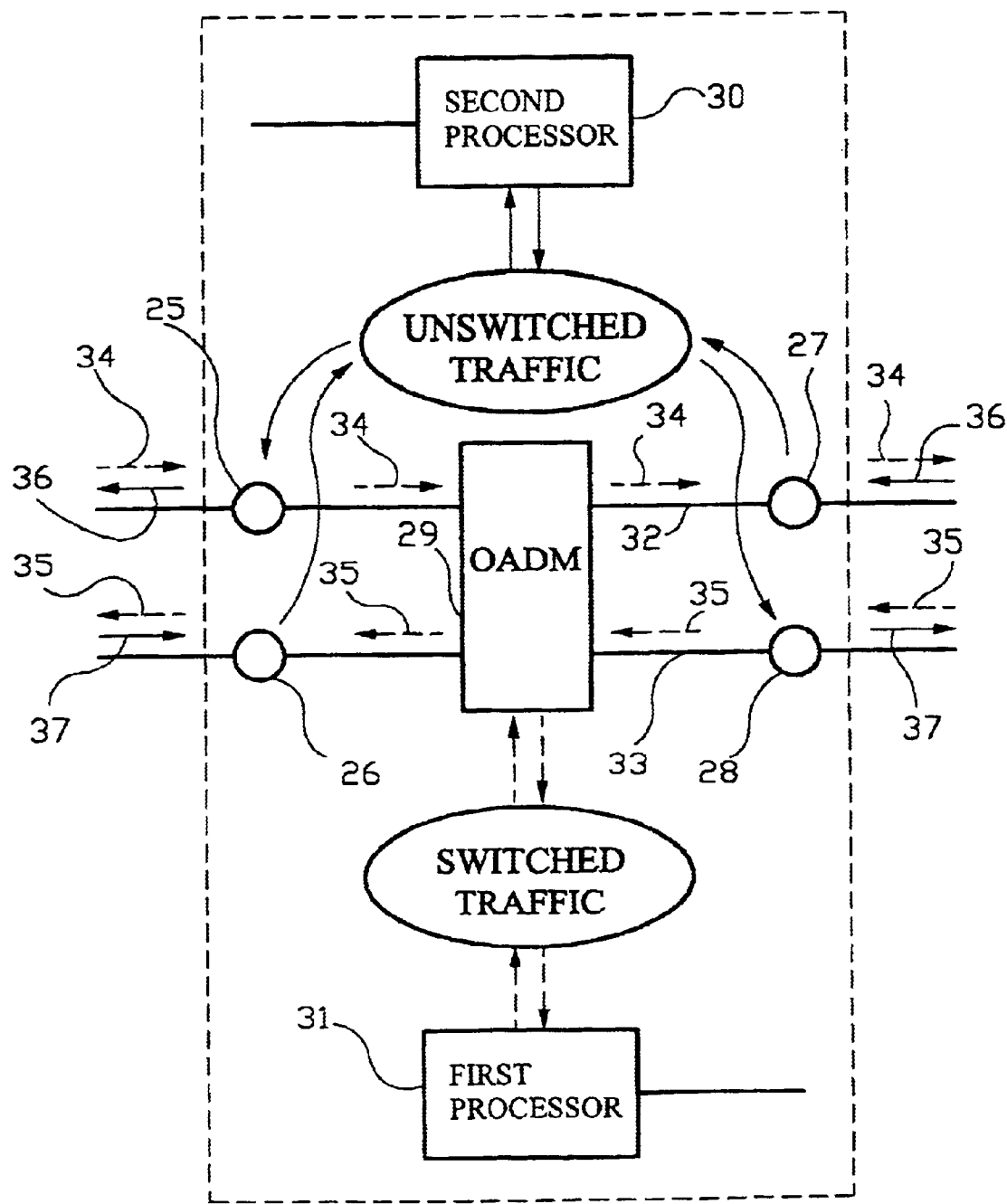
FIG. 3 is an optical communication network configured by the preferred method shown in FIG. 1.

With reference to the FIG. 3, it shows an optical communication network has two network transmission paths 32, 33 for carrying switched signals and secondary signals.

The network also has a first processing means 31 for processing the switched signals in accordance with a first protection protocol, and a second processing means 30 for processing the secondary signals in accordance with a second protection protocol.

A primary add/drop mechanism (OADM) 29 is connected within the two network transmission paths 32, 33 for selectively adding and dropping the switched signals 34, 35 on the two transmission paths 32, 33.

A secondary add/drop mechanism includes circulators 25, 26, 27, 28 for selectively adding and dropping said secondary signals 36, 37 on the two transmission paths 32, 33.

The primary add/drop mechanism 29 is configured to add and drop switched signal 34 from left to right in the network transmission path 32, to add and drop switched signal 35 from right to left in the network transmission path 33.

The second add/drop mechanism is configured to add and drop secondary signals from right to left in the network transmission path 32, to add and drop secondary signals 37 from left to right in the network transmission path 33.

Whereby the primary add/drop mechanism 29 and the second add/drop mechanism are configured to add and drop the switched and the secondary signals to counter-propagate along the two network transmission paths 32, 33.

Alternative embodiments can be made for the above said optical communication network shown in FIG. 3 and are described as follows:

The transmission paths 32, 33 are more than two paths.

The secondary add/drop mechanism is an optical circulator.

The primary add/drop mechanism 29 is an optical add/drop mechanism.

The optical communication network further comprises a redundant unswitched transmission path for the secondary signals.

Unswitched WDM channels can be added, dropped and passed through independently from the switched traffic. If optical amplifiers are required, they can be located within the OADM for the optically switched channels and located on the circulator traffic way for the unswitched channels. The optical amplifiers can be standard unidirectional amplifiers with optical isolators, so that they provide further isolation from the traffic propagating in the opposite direction.

The secondary signals are unswitched signals.

The second signals are selected from the group consisting of switched traffic and switched traffic.

The second signals are selected from the group of WDM signals and DWDM signals.

The switched signals are selected from the group of WDM signal and DWDM signals.

The first protection protocol is assigned from the group consisting of optical UPSR, optical BLSR, or optical shared-wavelength path-switched ring.

The second protection protocol is assigned from the group consisting of SONET UPSR, SONET BLSR, path-switched, line switched external-protection protocols.

The unswitched signals are assigned an unswitched traffic transmission format and the switched signals are assigned a switched traffic transmission format.

The unswitched transmission format and the switched transmission format may be selected from the group consisting of SONET, Ethernet, fiber channel, ESCON, FICON, FDDI.

Figure 4:
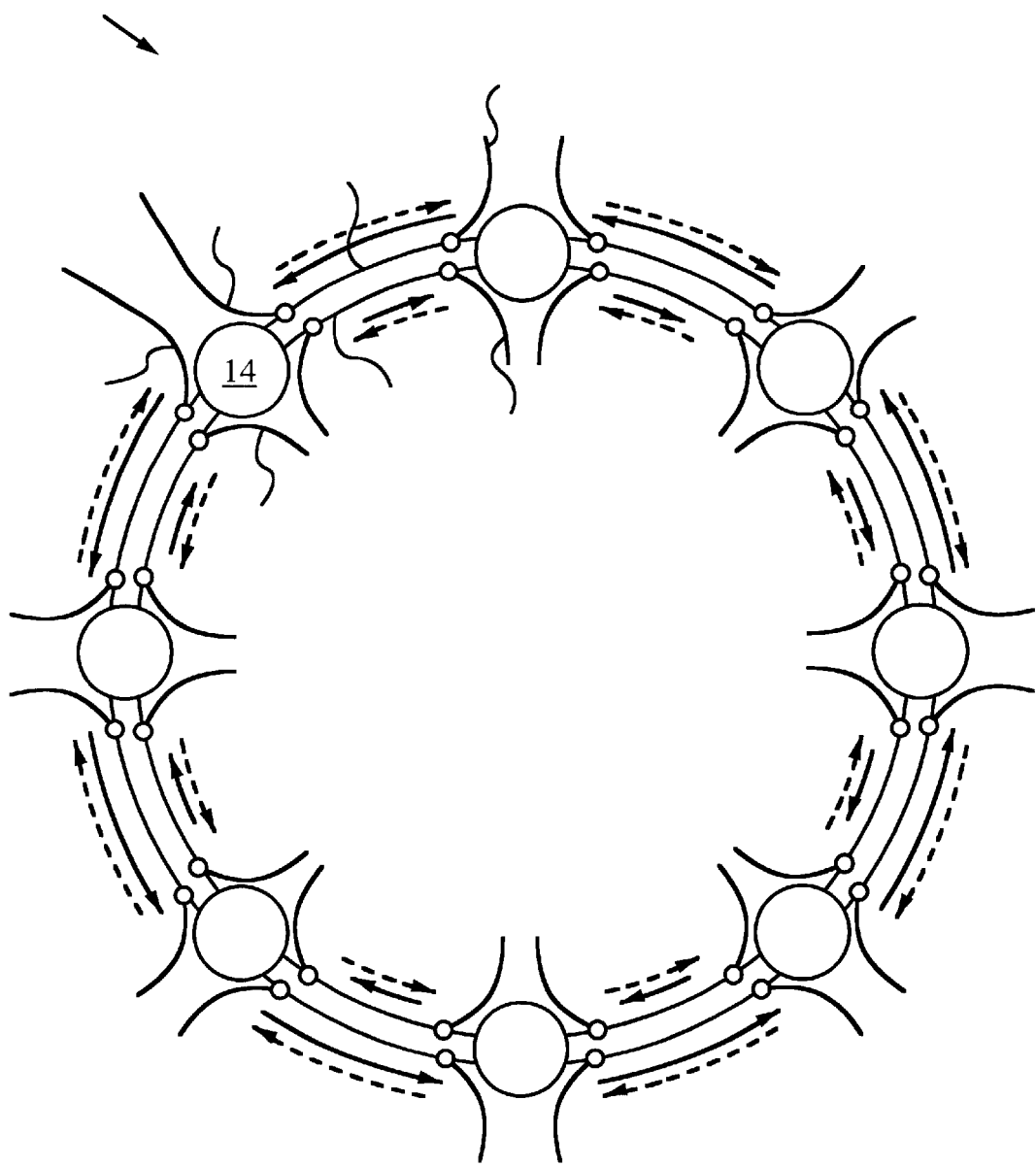
FIG. 4 is an optical ring communication network configured by the preferred method shown in FIG. 1.

With reference to the FIG. 4, it shows an optical ring communication network. It is an alternative embodiment of the communication network shown in FIG. 3. It has several node 42 which has the same configuration as the optical communication network shown in FIG. 3. The node comprises a primary add/drop mechanism 43, a secondary add/drop mechanism including circulators 44, 45, 46, 47. Two communication paths 40, 41 connect the several nodes 42 to be a ring. The running ways of switched and secondary signals are the same as the ways described in FIGS. 1 and 3, i.e., the primary add/drop mechanism 43 and the second add/drop mechanism are configured to add and drop the switched and the secondary signals to counter-propagate along the two network transmission paths 40, 41.

As an alternative embodiment, the communication path is optical fiber. The ring is selected from the group consisting of two-fiber rings and four-fiber rings. In all case WDM filters may be used to multiplex several channels on separate wavelengths. An arbitrary numbers of wavelengths may be assigned to either of the protection protocols. These signals may be added and dropped at separate nodes around the ring.

What is claimed is:

1. A method of operating a redundant optical communication network having at least two network transmission paths for carrying one or more switched signals and one or more unswitched signals, said method comprising:

assigning a first protection protocol to said switched signals;

assigning a second protection protocol to said unswitched signals, said second protection protocol being different than said first protection protocol;

selectively adding and dropping said switched signals on said at least two transmission paths; and selectively adding and dropping said unswitched signals on said at least two transmission paths;

whereby said adding and dropping steps are performed such that said switched signals and said unswitched signals are counter-propagating along said at least two network transmission paths.

2. The method of claim 1, wherein said optical communication network is a ring and said switched signals and said unswitched signals are selectively added and dropped at different location on said ring.

3. The method of claim 2, wherein said ring is selected from the group consisting of two-fiber rings and four-fiber rings.

4. The method of claim 1, wherein said step of selective adding and dropping of said unswitched signals is performed by a circulator.

5. The method of claim 1, wherein said step of selective adding and dropping of said switched signals is performed by an optical add/drop mechanism.

6. The method of claim 1, wherein said optical communication network has nodes and said step of selective adding and dropping of said switched signals is performed at said nodes.

7. The method of claim 6, wherein said step of selective adding and dropping of said unswitched signals is performed away from said nodes.

8. The method of claim 1, wherein said first protection protocol is assigned from the group consisting of optical UPSR, optical BLSR, or optical shared-wavelength, path-switched ring.

9. The method of claim 1, wherein said second protection protocol is assigned from the group consisting of SONET UPSR, SONET BLSR, path-switched, line switched external-protection protocols.

10. The method of claim 1, wherein said switched signals comprise a group of WDM signals.

11. The method of claim 1, wherein said unswitched signals comprise a group of WDM signals.

12. The method of claim 1, wherein said unswitched signals are assigned an unswitched traffic transmission format and said switched signals are assigned a switched traffic format.

13. The method of claim 12, wherein said unswitched transmission format and said switched transmission format are selected from the group consisting of SONET, Ethernet, fiber channel, ESCON, FICON, FDDI.

14. The method of claim 1, further comprising the step of providing redundant unswitched transmission paths for said unswitched signals.

15. An optical communication network having at least two network transmission paths for carrying switched signals and unswitched signals, said optical communication network comprising:

a first processing means for processing said switched signals in accordance with a first protection protocol;

a second processing means for processing said unswitched signals in accordance with a second protection protocol, said second protection protocol being different than said first protection protocol;

a primary add/drop mechanism for selectively adding and dropping said switched signals on said at least two transmission paths;

a unswitched add/drop mechanism for selectively adding and dropping said unswitched signals on said at least two transmission paths;

whereby said primary add/drop mechanism and said second add/drop mechanism are configured to add and drop said switched and said unswitched signals to counter-propagate along said at least two network transmission paths.

16. The optical communication network of claim 15, wherein said unswitched signals add/drop mechanism is an optical circulator.

17. The optical communication network of claim 15, wherein said primary signals add/drop mechanism is an optical add/drop mechanism.

18. The optical communication network of claim 15, further comprising a redundant unswitched transmission path for said unswitched signals.

19. The optical communication network of claim 15, wherein said optical network is a ring.

20. The optical communication network of claim 19, wherein said ring is selected from the group consisting of two-fiber rings and four-fiber rings.

21. A method of operating a redundant optical communication network having at least two network transmission paths for carrying one or more switched signals and one or more unswitched signals, said method comprising:

assigning a first protection protocol to said switched signals;

assigning a second protection protocol to said unswitched signals, said second protection protocol being different than said first protection protocol;

selectively adding and dropping said switched signals on said at least two transmission paths; and selectively adding and dropping said unswitched signals on said at least two transmission paths;

whereby said adding and dropping are performed such that said switched signals and said unswitched signals are counter-propagating along said at least two network transmission paths; wherein said optical communication network is a ring and said switched signals and said unswitched signals are selectively added and dropped at different location on said ring wherein said selective adding and dropping of said unswitched signals is performed by a circulator and selective adding and dropping-of said switched signals is performed by an optical add/drop mechanism.

* * * * *